(12) United States Patent
Ikemoto

(10) Patent No.: US 10,378,476 B2
(45) Date of Patent: Aug. 13, 2019

(54) INTERNAL COMBUSTION ENGINE

(71) Applicant: TOYOTA JIDOSHA KABUSHIKI KAISHA, Toyota-shi, Aichi-ken (JP)

(72) Inventor: Masato Ikemoto, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 221 days.

(21) Appl. No.: 14/921,419

(22) Filed: Oct. 23, 2015

(65) Prior Publication Data

US 2016/0123270 A1 May 5, 2016

(30) Foreign Application Priority Data

Oct. 30, 2014 (JP) .................................. 2014-221789

(51) Int. Cl.
| | | |
|---|---|---|
| B60T 7/12 | (2006.01) | |
| F02D 41/40 | (2006.01) | |
| F02D 41/20 | (2006.01) | |
| F02D 41/38 | (2006.01) | |

(Continued)

(52) U.S. Cl.
CPC ........... *F02D 41/405* (2013.01); *F02D 41/20* (2013.01); *F02D 41/3836* (2013.01); *F02D 41/047* (2013.01); *F02D 2041/389* (2013.01); *F02D 2200/0614* (2013.01); *F02D 2200/101* (2013.01); *F02D 2250/38* (2013.01); *F02M 45/04* (2013.01); *Y02T 10/44* (2013.01)

(58) Field of Classification Search
CPC .... F02D 41/405; F02D 41/20; F02D 41/3836; F02D 41/047; F02D 2041/389; F02D 2200/0614; F02D 2250/38; F02D 2200/101; F02M 45/04; Y02T 10/44

USPC .......................................................... 701/103
See application file for complete search history.

(56) References Cited

U.S. PATENT DOCUMENTS

| | | | | |
|---|---|---|---|---|
| 6,543,419 B2* | 4/2003 | Okamoto | ................ | F02B 31/06 123/442 |
| 8,596,245 B2* | 12/2013 | Hiratani | .............. | F02D 41/0085 123/299 |
| 2001/0023686 A1 | 9/2001 | Okamoto et al. | | |

(Continued)

FOREIGN PATENT DOCUMENTS

| | | |
|---|---|---|
| EP | 1375886 A2 | 1/2004 |
| JP | S62-070645 A | 4/1987 |

(Continued)

*Primary Examiner* — Hung Q Nguyen
*Assistant Examiner* — Anthony Donald Taylor, Jr.
(74) *Attorney, Agent, or Firm* — Finnegan, Henderson, Farabow, Garrett & Dunner, LLP

(57) ABSTRACT

A post injection is utilized in a more effective manner. In an internal combustion engine which is provided with a fuel injection valve for injecting fuel into a cylinder of the internal combustion engine, in cases where a post injection is carried out after a main injection of fuel from the fuel injection valve, when a rotation speed of the internal combustion engine is equal to or more than a first predetermined speed, a penetration force of fuel in the post injection is made larger than a penetration force of fuel in the main injection, whereas when the rotation speed of the internal combustion engine is less than a second predetermined speed which is equal to or less than the first predetermined speed, the penetration force of fuel in the post injection is made smaller than the penetration force of fuel in the main injection.

4 Claims, 17 Drawing Sheets

(51) Int. Cl.
*F02D 41/04* (2006.01)
*F02M 45/04* (2006.01)

(56) References Cited

U.S. PATENT DOCUMENTS

| | | | |
|---|---|---|---|
| 2004/0194756 A1 | 10/2004 | Hotta et al. | |
| 2004/0237930 A1* | 12/2004 | Kawamura | F02M 45/04 |
| | | | 123/299 |
| 2007/0074702 A1* | 4/2007 | Nakamura | F01N 3/035 |
| | | | 123/299 |
| 2008/0103675 A1* | 5/2008 | Ishizuka | F02D 41/123 |
| | | | 701/103 |
| 2008/0243358 A1* | 10/2008 | Kojima | F02D 35/025 |
| | | | 701/102 |
| 2008/0281500 A1* | 11/2008 | Nakata | F02D 41/3809 |
| | | | 701/103 |
| 2010/0312454 A1* | 12/2010 | Nada | F02D 41/403 |
| | | | 701/103 |
| 2011/0180039 A1* | 7/2011 | Nada | F02D 35/02 |
| | | | 123/445 |
| 2012/0000197 A1 | 1/2012 | Maruyama et al. | |
| 2012/0016571 A1* | 1/2012 | Nada | F02D 41/3035 |
| | | | 701/104 |
| 2012/0143479 A1* | 6/2012 | Nada | F02D 41/3029 |
| | | | 701/104 |
| 2013/0041571 A1* | 2/2013 | Nogi | F02D 41/025 |
| | | | 701/103 |

FOREIGN PATENT DOCUMENTS

| | | |
|---|---|---|
| JP | H11-182311 A | 7/1999 |
| JP | 2004-027885 A | 1/2004 |
| JP | 2004-044494 A | 2/2004 |
| JP | 2012-031844 A | 2/2012 |
| JP | 2012-241638 A | 12/2012 |
| JP | 2012-241663 | 12/2012 |
| JP | 2013-24197 | 2/2013 |
| WO | WO-2010/035342 A1 | 4/2010 |
| WO | WO-2012/029180 A1 | 3/2012 |

* cited by examiner

[Fig. 1]
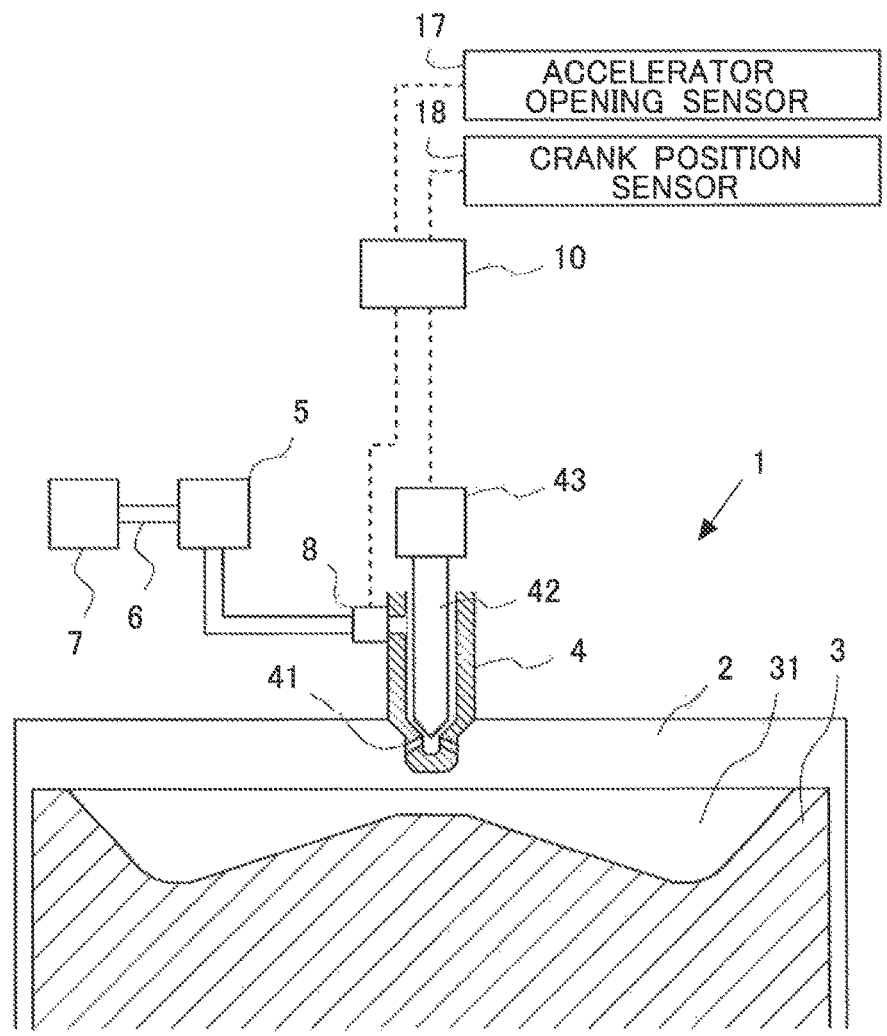

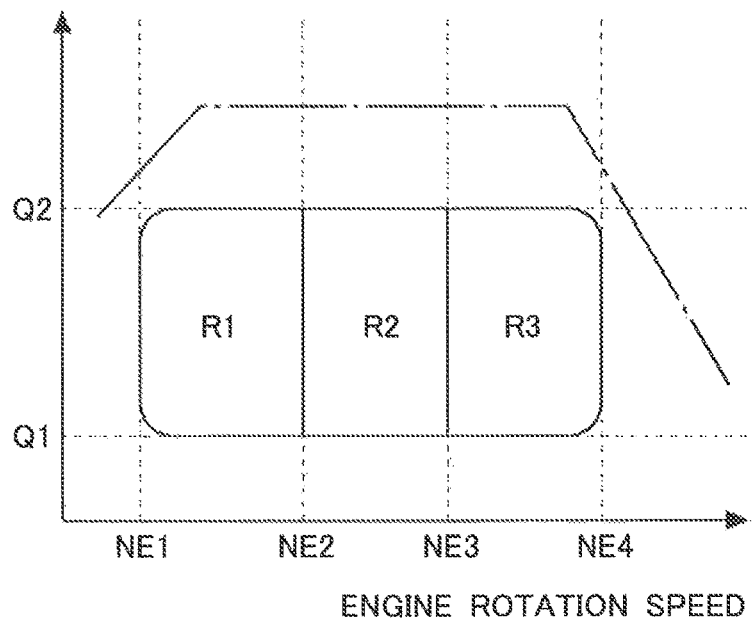

[Fig. 3A]
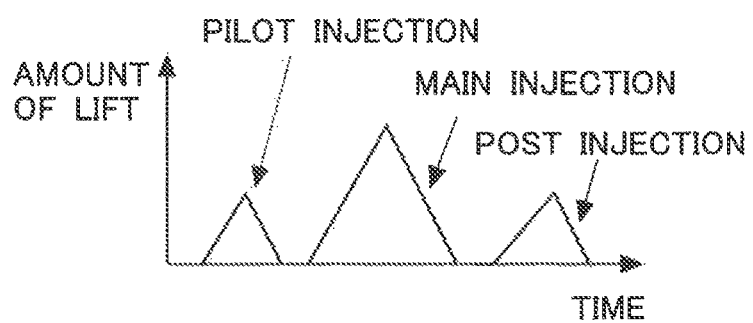

[Fig. 3B]
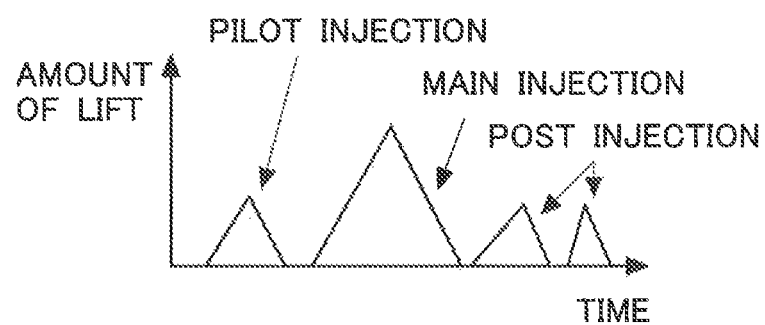

[Fig. 3C]
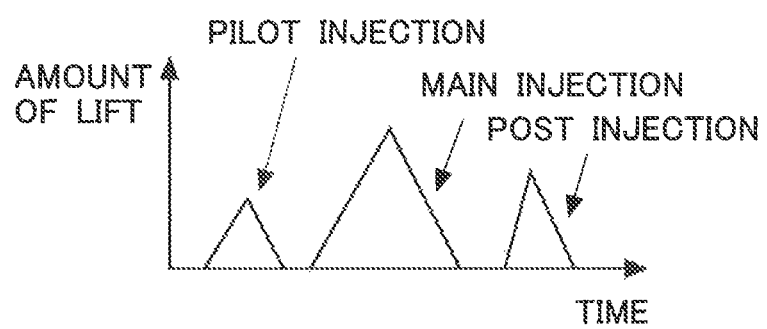

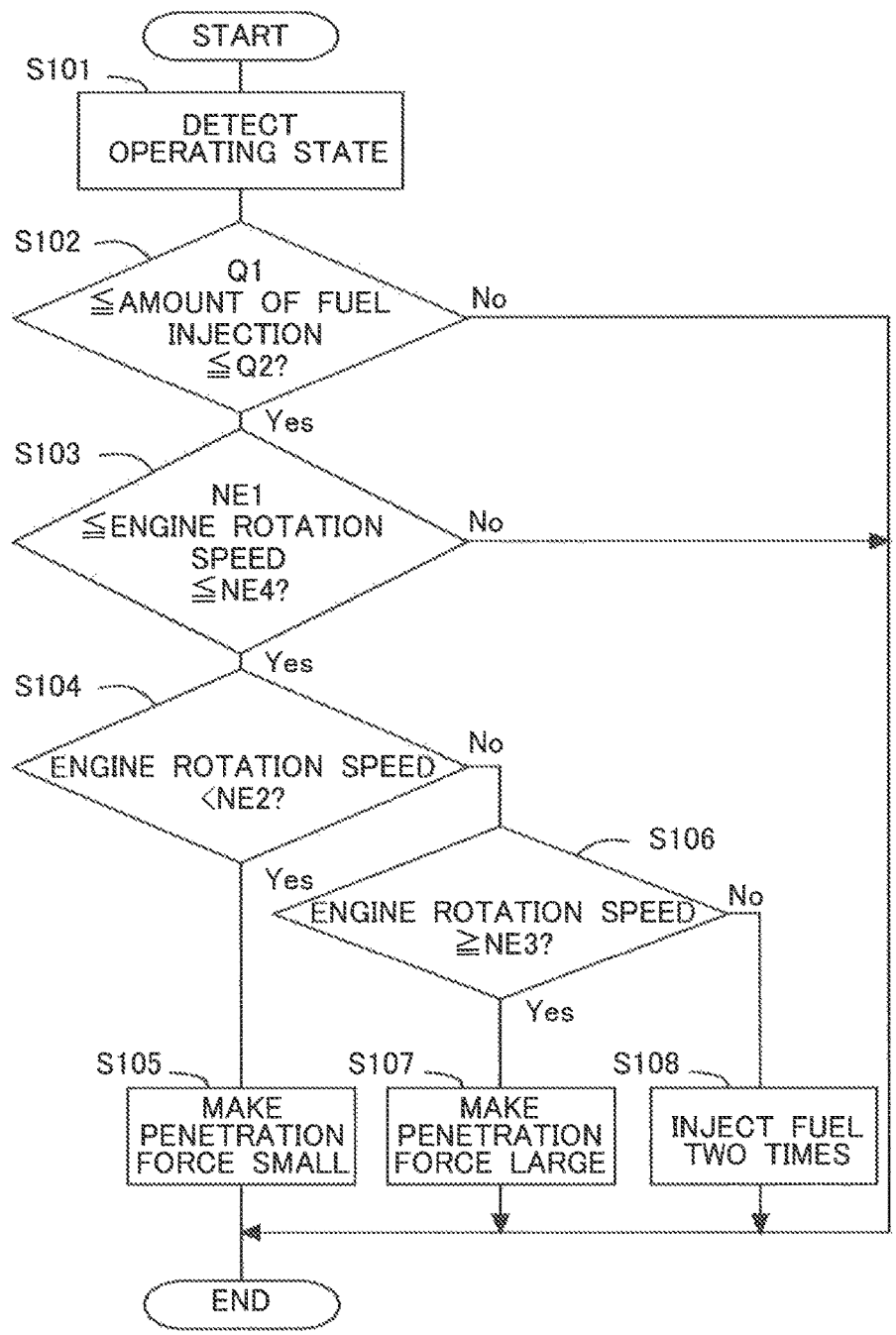
[Fig. 4]

[Fig. 5]
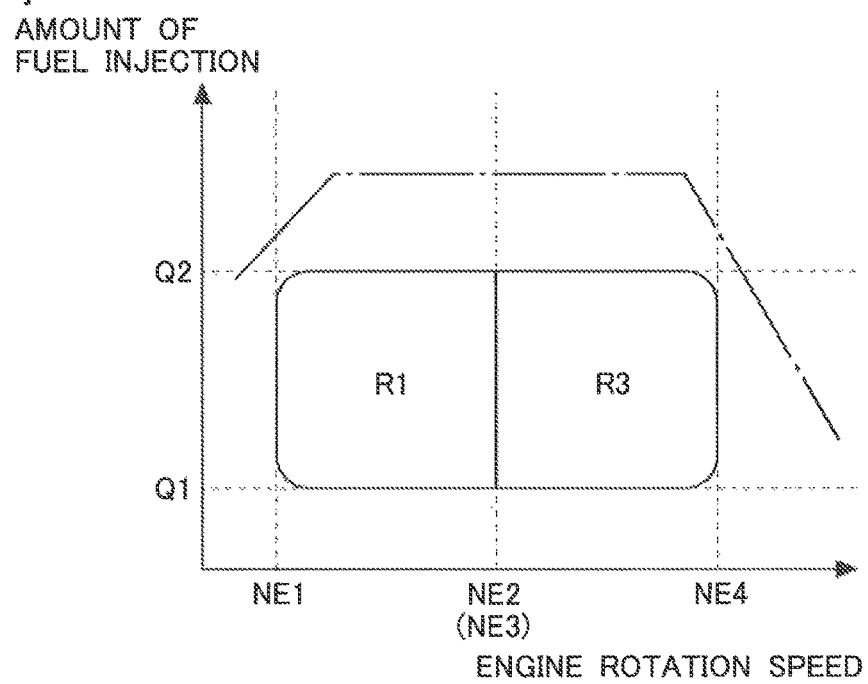

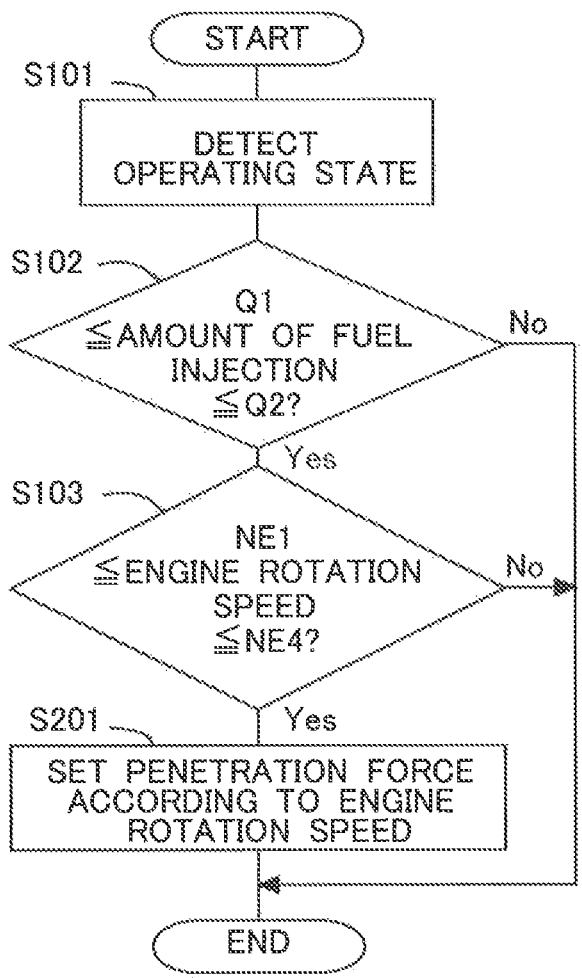

[Fig. 7A]
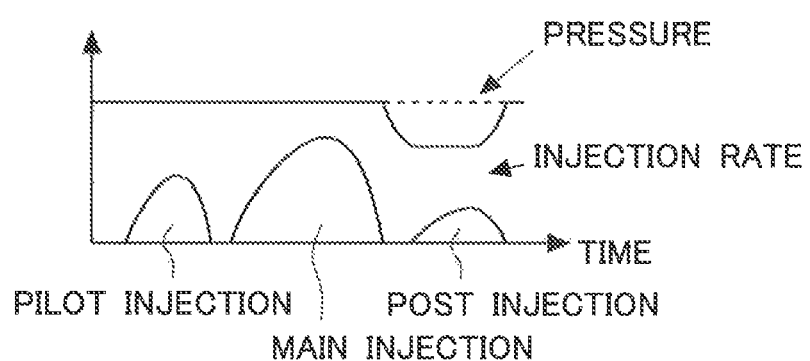

[Fig. 7B]
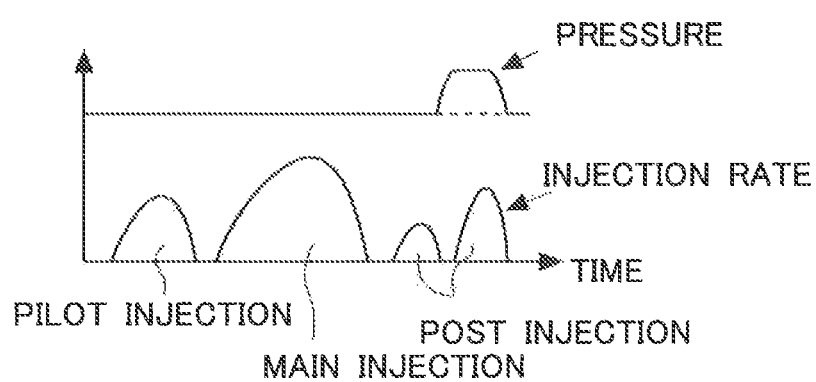

[Fig. 7C]
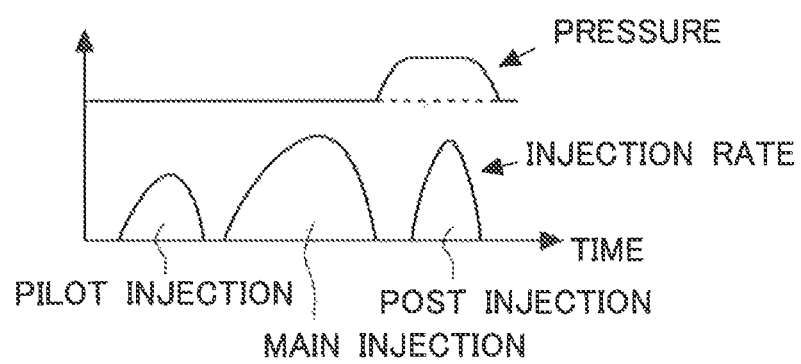

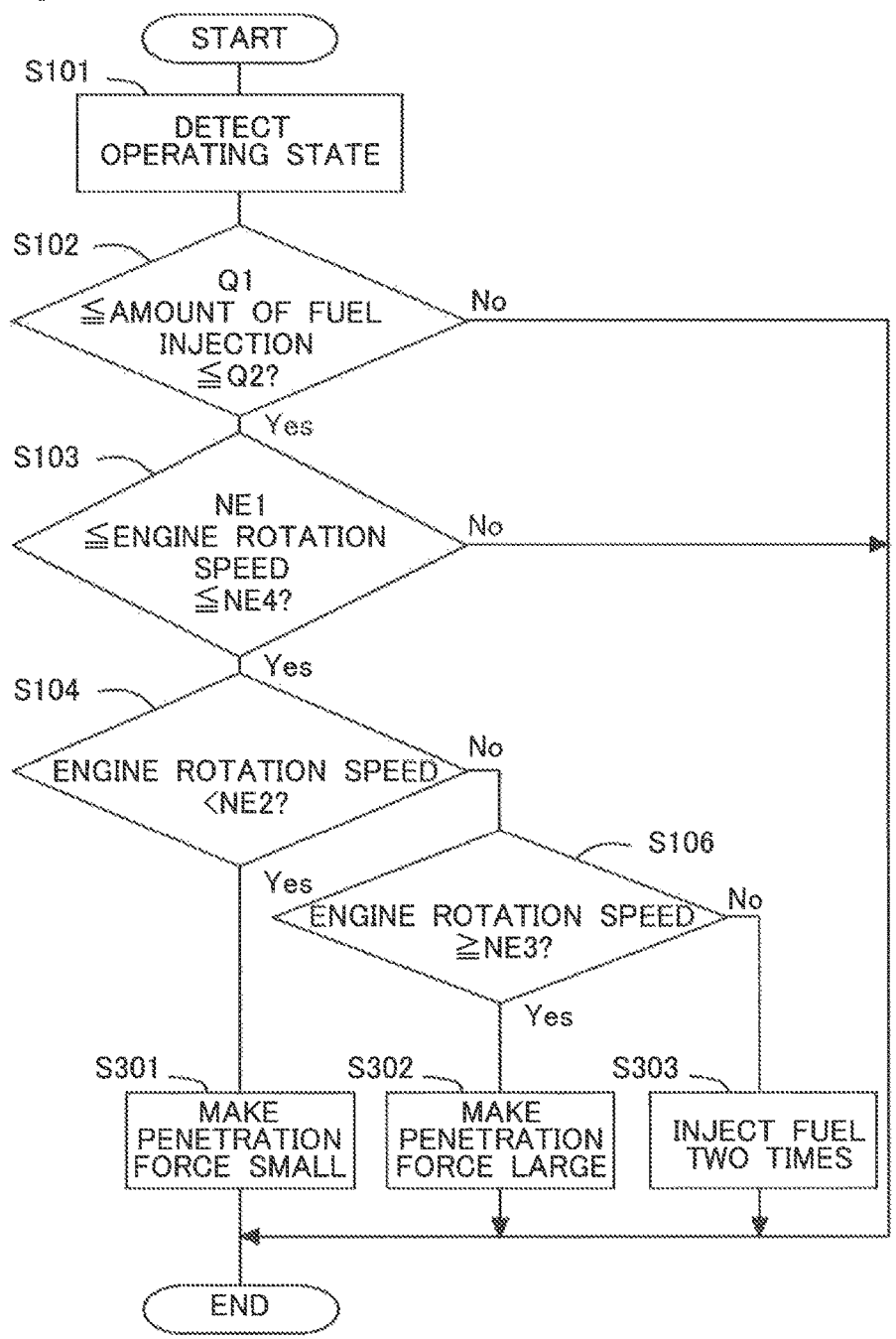
[Fig. 8]

[Fig. 9]
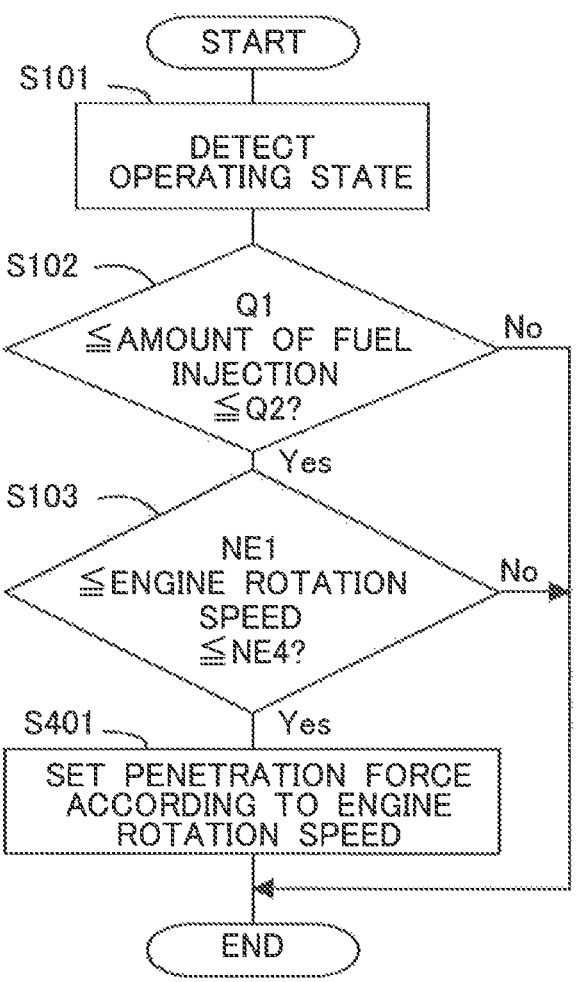

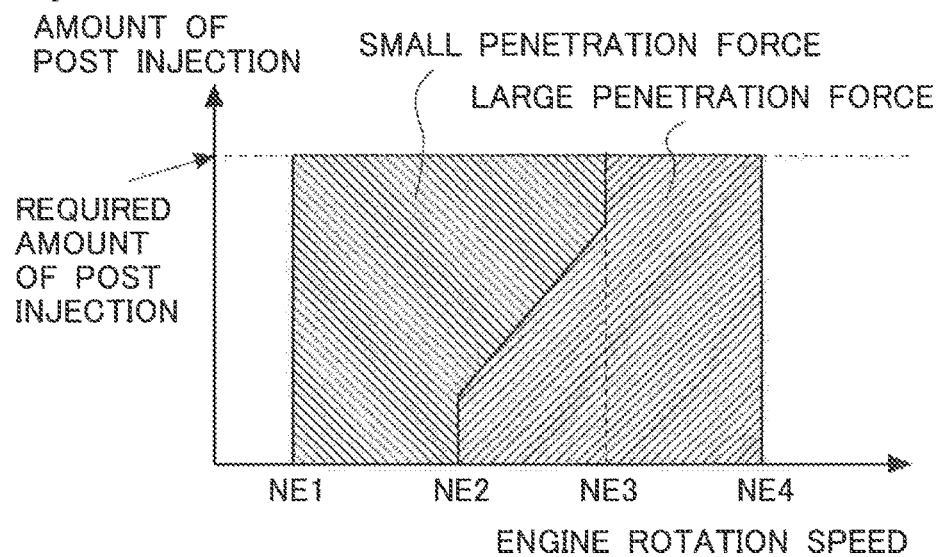
[Fig. 10]

[Fig. 11A]
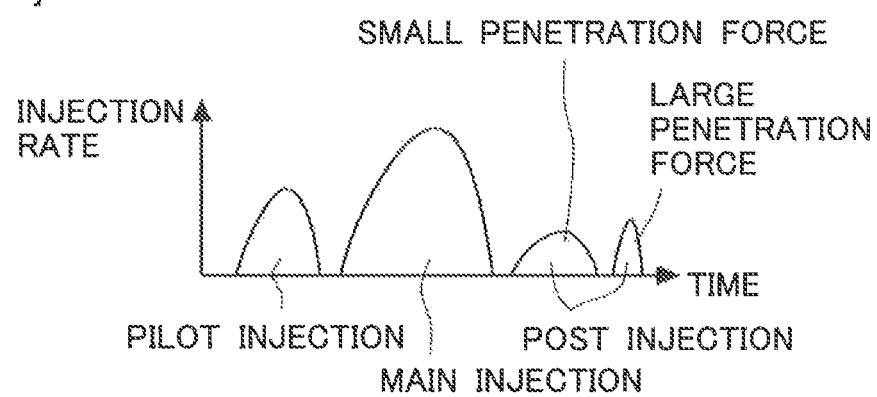

[Fig. 11B]
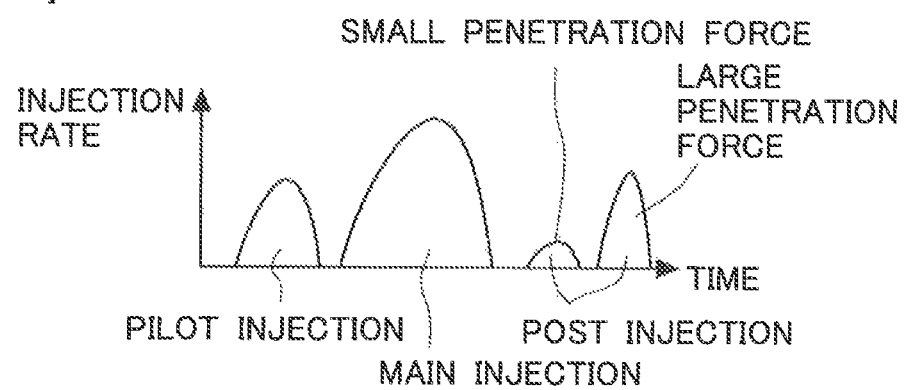

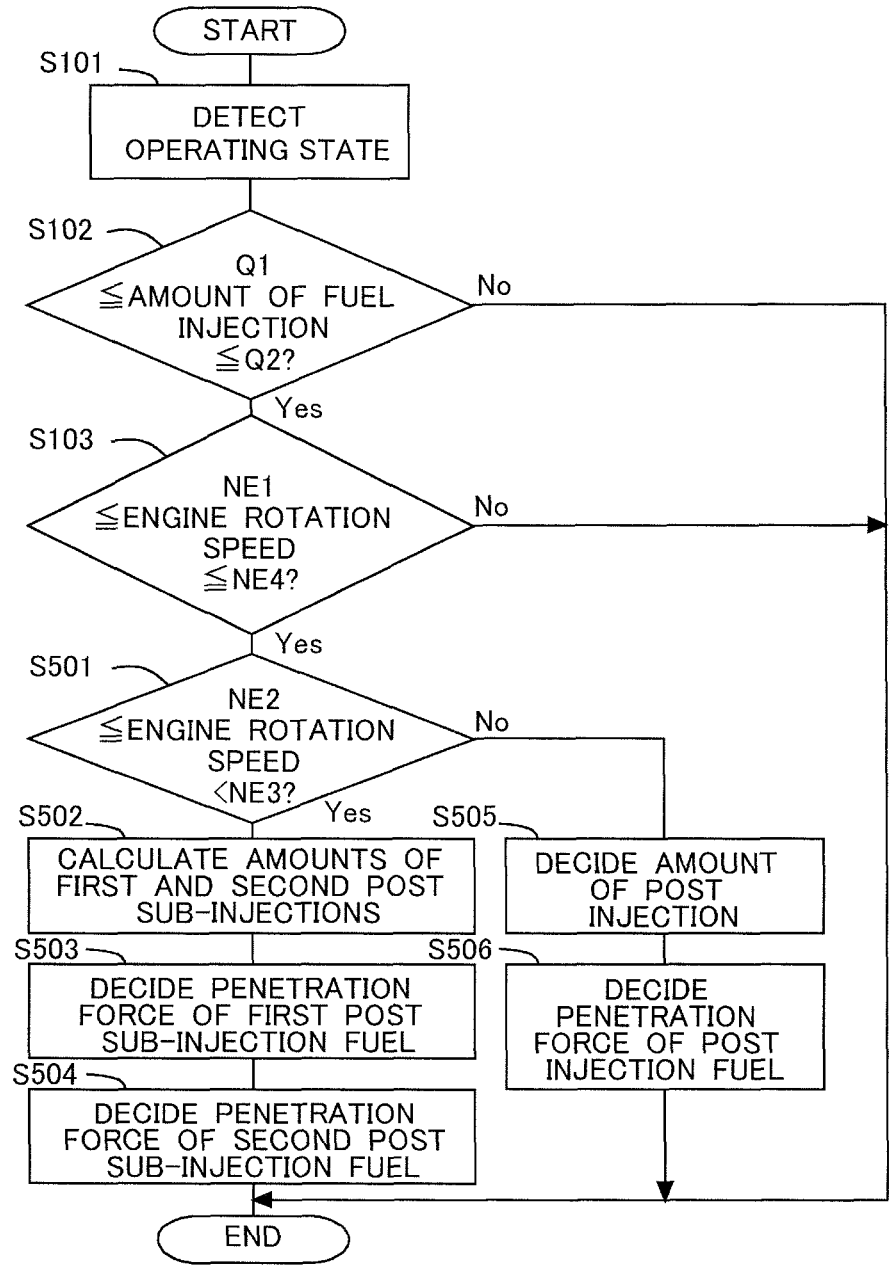

INTERNAL COMBUSTION ENGINE

CROSS REFERENCE TO RELATED APPLICATIONS

This application claims priority to Japanese Patent Application No. 2014-221789 filed on Oct. 30, 2014, the entire contents of which are incorporated by reference herein.

TECHNICAL FIELD

The present invention relates to an internal combustion engine.

BACKGROUND ART

It is known that fuel injection into a cylinder of an internal combustion engine is carried out by being divided into a plurality of injections. With this, combustion can be promoted by carrying out an after or post injection after a main injection, so that smoke can be reduced or fuel economy can be improved. Here, there have been known a technique of making a change of an injection rate of fuel (an amount of injection of fuel per unit time) from a fuel injection valve in an initial or early injection stage of a post injection larger than that of a main injection, and a technique of changing an injection rate of fuel by making the speed of a needle in a fuel injection valve at the time of a post injection higher than that at the time of a main injection (for example, refer to a first patent literature). In these techniques, a penetration force of fuel at the time of the post injection is made large.

CITATION LIST

Patent Literature

[First Patent Literature] Japanese patent laid-open publication No. 2012-241663
[Second Patent Literature] Japanese patent laid-open publication No. 2013-024197

SUMMARY OF INVENTION

Technical Problem

In a diesel engine in which fuel is self-ignited, the following two merits or advantageous effects can be mentioned as main effects at the time when a post injection is carried out after a main injection. A first effect is one which is achieved by the perturbation or agitation of combustion gas. In the diesel engine, when a main injection of fuel is carried out into a cylinder from a fuel injection valve and the fuel combusts, the penetration force of the fuel may decrease and combustion gas may stay in a specific location. Here, the staying combustion gas can be perturbed or agitated by carrying out a post injection in the later or second half of combustion of the fuel injected by the main injection. The mixing of fuel and air is promoted by this perturbation or agitation of the combustion gas, so that the speed or rate of combustion can be made to increase. Then, by increasing the combustion speed or rate, the degree of constant volume can be improved, thus making it possible to improve fuel economy. In addition, the re-oxidation of soot can be promoted by the agitation of the combustion gas, so that the generation of smoke can be reduced. Due to the reduction in the generation of smoke, a much larger amount of heat can be generated, so that fuel economy can also be thereby improved.

A second effect is one which is achieved by the combustion of fuel by means of the post injection using the oxygen which remains in the vicinity of the fuel injection valve (or which may also be at a cylinder center side). The fuel supplied by the main injection advances toward a cylinder wall surface side by means of the penetration force of the fuel, and thereafter self-ignition of the fuel occurs, so that the combustion of the fuel starts at the cylinder wall surface side. For this reason, during the fuel supplied by the main injection combusts at the cylinder wall surface side, a large amount of oxygen remains at the cylinder center side. Accordingly, by carrying out the post injection to the cylinder center side which has become high temperature and high pressure at the time when the fuel supplied by the main injection combusts at the cylinder wall surface side, it is possible to combust the fuel by using a lot of oxygen remaining at the cylinder center side. Thus, by combusting the fuel supplied by the post injection at the cylinder center side at which the lot of oxygen remains, it is possible to make effective use of the oxygen in the cylinder. As a result of this, the generation of smoke can be reduced, or fuel economy can be improved.

Here, in the conventional techniques, the penetration force of fuel at the time of carrying out the post injection is made large. In this case, the effect due to the perturbation or agitation of combustion gas is mainly intended to be achieved. However, a greater effect can be obtained by aiming at the effect of using oxygen at the cylinder center side rather than aiming at the effect achieved by the agitation of the combustion gas, depending on an operating state of the internal combustion engine.

The present invention has been made in view of the problems as mentioned above, and the object of the invention is to utilize a post injection in a more effective manner.

Solution to Problem

In order to achieve the above-mentioned object, the present invention resides in an internal combustion engine which is provided with a fuel injection valve for injecting fuel into a cylinder of the internal combustion engine, said engine including a controller that controls the fuel to be injected from the fuel injection valve in the case of a post injection being carried out after a main injection of fuel from the fuel injection valve, in such a manner that when the rotation speed of the internal combustion engine is equal to or more than a first predetermined speed, a penetration force of fuel in the post injection is made larger than a penetration force of fuel in the main injection, whereas when the rotation speed of the internal combustion engine is less than a second predetermined speed which is equal to or less than said first predetermined speed, the penetration force of fuel in the post injection is made smaller than the penetration force of fuel in the main injection.

The post injection is a fuel injection which is carried out after the main injection, and which is carried out in order to generate the torque of the internal combustion engine. Here, the combustion gas supplied by the main injection can be perturbed or agitated by the fuel supplied by the post injection by making the penetration force of fuel at the time of the post injection larger than the penetration force of fuel at the time of the main injection. For this reason, the effect of the agitation of the combustion gas becomes large. On the other hand, by making the penetration force of fuel at the time of the post injection smaller than the penetration force of fuel at the time of the main injection, the fuel supplied by the post injection can be made to combust in a location where the concentration of oxygen at the cylinder center side is relatively high. For this reason, the effect of making use of the oxygen at the cylinder center side becomes large. In either case, the combustion of the fuel can be promoted by carrying out the post injection, thus making it possible to attain the suppression of smoke and the improvement in fuel economy.

In the case where a fuel with a large penetration force is injected, and in the case where a fuel with a small penetration force is injected at the time of the post injection, which of these cases is more effective for promoting combustion varies according to the operating state of the internal combustion engine. In cases where the engine rotation speed is high, the re-oxidation of soot can be promoted more when the agitation of the combustion gas is promoted than when the use of the oxygen at the cylinder center side is promoted, so that the generation of smoke can be suppressed. That is, in cases where the rotation speed of the internal combustion engine is relatively high, the generation of smoke can be reduced more by injecting the fuel with a large penetration force at the time of the post injection.

On the other hand, in cases where the rotation speed of the internal combustion engine is low, the effect due to the agitation of the combustion gas is small, even if the penetration force of fuel is made large at the time of the post injection. Accordingly, in cases where the rotation speed of the internal combustion engine is relatively low, the generation of smoke can be suppressed more when the use of the oxygen at the cylinder center side is promoted, than when the agitation of the combustion gas is promoted. That is, in cases where the rotation speed of the internal combustion engine is relatively low, the generation of smoke can be reduced more by injecting the fuel with a small penetration force at the time of the post injection.

Accordingly, when the rotation speed of the internal combustion engine is equal to or more than the first predetermined speed, the penetration force of fuel at the time of the post injection is made larger than the penetration force of fuel at the time of the main injection, whereas when the rotation speed of the internal combustion engine is less than the second predetermined speed, the penetration force of fuel at the time of the post injection is made smaller than the penetration force of fuel at the time of the main injection, whereby the generation of smoke can be suppressed. As a result, it is also possible to improve fuel economy. Here, note that, the first predetermined speed is set in a range of the engine rotation speed in which the generation of smoke can be reduced more by making the penetration force of fuel at the time of the post injection larger with respect to the penetration force of fuel at the time of the main injection, than by making the penetration force of fuel at the time of the post injection smaller than the penetration force of fuel at the time of the main injection. In addition, the second predetermined speed is set in a range of the engine rotation speed in which the generation of smoke can be reduced more by making the penetration force of fuel at the time of the post injection smaller with respect to the penetration force of fuel at the time of the main injection, than by making the penetration force of fuel at the time of the post injection larger than the penetration force of fuel at the time of the main injection.

In addition, in cases where the rotation speed of said internal combustion engine is equal to or more than said second predetermined speed, and at the same time is less than said first predetermined speed, said controller carries out the post injection a plurality of times after the main injection, and in the course of the post injection being carried out the plurality of times after the main injection, the post injection can be carried out including sub-injections with their penetration forces of fuel being different from each other.

That is, the post injection can also be carried out by being divided into a plurality of sub-injections. By carrying out the post injection while dividing it into the plurality of sub-injections, the penetration force of fuel can be changed at the time of each sub-injection. Here, as mentioned above, when the post injection is carried out in the case where the rotation speed of the internal combustion engine is low, the effect of making use of the oxygen at the cylinder center side becomes larger than the effect due to the agitation of the combustion gas. Then, the higher the rotation speed of the internal combustion engine, the larger the effect due to the agitation of the combustion gas also becomes. For this reason, in the case where the rotation speed of the internal combustion engine is equal to or more than the second predetermined speed, and at the same time is less than the first predetermined speed, it is possible to obtain the effect due to the agitation of the combustion gas and the effect due to the use of oxygen at the cylinder center side, respectively. However, in cases where the post injection is carried out only once, without being divided into a plurality of sub-injections, it is only possible to make the penetration force of fuel in the post injection large or small. For this reason, one of the two effects becomes large, but the other effect becomes small, as a result of which the effect of reducing smoke is small as a whole. On the other hand, by dividing the post injection into a plurality of sub-injections, and combining fuel injections in which the penetration force of fuel is higher than the main injection, fuel injections in which the penetration force of fuel is lower than the main injection, and fuel injections in which the penetration force of fuel is the same as that in the main injection, the effect due to the agitation of the combustion gas and the effect of making use of the oxygen at the cylinder center side can be obtained, respectively, so that the effect of reducing smoke can be made much larger.

Moreover, said controller can make the penetration force of fuel in the post injection larger in accordance with the increasing rotation speed of said internal combustion engine.

Here, the higher the rotation speed of the internal combustion engine, the shorter becomes the period of time in which the re-oxidation of soot is carried out. In order to promote the re-oxidation of soot, it is effective to make the penetration force of fuel in the post injection large. Then, the higher the rotation speed of the internal combustion engine, the shorter becomes the period of time in which the re-oxidation of soot is carried out, so that the generation of smoke can be suppressed more by making large the effect of promoting the re-oxidation of soot. On the other hand, the lower the rotation speed of the internal combustion engine, the longer becomes the period of time in which the re-oxidation of soot is carried out, so that the effect due to the agitation of the combustion gas becomes small, but on the other hand, the effect of making use of the oxygen at the cylinder center side becomes large. That is, at the time of the post injection, the higher the rotation speed of the internal combustion engine, the larger the penetration force of fuel is made, whereas the lower the rotation speed of the internal combustion engine, the smaller the penetration force of fuel is made, whereby the effect of the post injection can be made much larger. Here, note that when the penetration force of fuel in the post injection is made larger in accordance with the increasing rotation speed of the internal combustion engine, the penetration force of the post injection may also be made larger in a stepwise manner or in a stepless manner (continuously) according to the rotation speed of the internal combustion engine.

Further, when said post injection is carried out by being divided into a plurality of sub-injections, said controller can carry out the post injection including a sub-injection in which the penetration force of fuel is larger than that in the main injection, and a sub-injection in which the penetration force of fuel is smaller than that in the main injection, and can make a ratio of an amount of fuel injection in said sub-injection in which the penetration force of fuel is larger than that in the main injection with respect to a total amount of fuel injection in the post injection higher in accordance with the increasing rotation speed of said internal combustion engine.

Here, the higher the rotation speed of the internal combustion engine, the shorter becomes the period of time in which the re-oxidation of soot is carried out. In order to promote the re-oxidation of soot, it is effective to make the penetration force of fuel in the post injection large. On the other hand, in cases where the rotation speed of the internal combustion engine is low, the effect of reducing smoke is higher when making use of the oxygen at the cylinder center side. Then, the higher the rotation speed of the internal combustion engine, the shorter becomes the period of time in which the re-oxidation of soot is carried out, so that the generation of smoke can be suppressed more by making large the effect of promoting the re-oxidation of soot. That is, at the time of the post injection, the higher the rotation speed of the internal combustion engine, the larger the amount of injection of the fuel with a large penetration force is made, whereby the effect of the post injection can be made much larger. Here, note that said ratio of the amount of fuel injection may be made larger in a stepwise manner or in a stepless manner (continuously) according to the rotation speed of the internal combustion engine.

In addition, said controller can make the penetration force of fuel in the post injection large by making a valve opening speed of a needle in said fuel injection valve high at the time of carrying out the post injection.

Here, the cross-sectional area of a passage for fuel can be increased in a quick manner by making the valve opening speed of the needle high, so that the penetration force of fuel can be made large in a quick manner. On the other hand, the cross-sectional area of the passage for fuel can be increased in a gradual or slow manner by making the valve opening speed of the needle low, so that the penetration force of fuel can be made large in a gradual or slow manner. Accordingly, by adjusting the valve opening speed of the needle at the time of the post injection, it is possible to adjust the penetration force of fuel.

Moreover, said controller can make the penetration force of fuel in the post injection large by making a pressure of said fuel high at the time of carrying out the post injection.

By making the pressure of the fuel high, it is possible to make the penetration force of the fuel large. Accordingly, the penetration force of the fuel can be adjusted by adjusting the pressure of the fuel at the time of the post injection.

Similarly, said controller can make the penetration force of fuel in the post injection small by making the valve opening speed of the needle in said fuel injection valve low at the time of carrying out the post injection.

Further, said controller can make the penetration force of fuel in the post injection small by making the pressure of said fuel low at the time of carrying out the post injection.

Advantageous Effects of Invention

According to the present invention, a post injection can be utilized in a more effective manner.

BRIEF DESCRIPTION OF DRAWINGS

FIG. 1 is a view showing the schematic construction of an internal combustion engine according to embodiments of the present invention.

FIG. 2 is a view showing the relation among an engine rotation speed, an amount of fuel injection, a region in which a post injection is carried out.

FIG. 3A is a time chart showing a change over time of an amount of lift of a needle in a fuel injection valve in the case of a first region R1.

FIG. 3B is a time chart showing a change over time of the amount of lift of the needle in the fuel injection valve in the case of a second region R2.

FIG. 3C is a time chart showing a change over time of the amount of lift of the needle in the fuel injection valve in the case of a third region R3.

FIG. 4 is a flow chart showing a flow for determining a penetration force of post injection fuel according to a first embodiment of the present invention.

FIG. 5 is a view showing the relation among the engine rotation speed, the amount of fuel injection, the region in which the post injection is carried out, in the case where the first region R1 and the third region R3 are provided.

FIG. 6 is a flow chart showing a flow for determining a penetration force of post injection fuel according to a second embodiment of the present invention.

FIG. 7A is a time chart showing changes over time of a pressure of fuel and an injection rate of fuel in the case of a first region R1.

FIG. 7B is a time chart showing changes over time of the pressure of fuel and the injection rate of fuel in the case of a second region R2.

FIG. 7C is a time chart showing changes over time of a pressure of fuel and an injection rate of fuel in the case of a third region R3.

FIG. 8 is a flow chart showing a flow for determining a penetration force of post injection fuel according to a third embodiment of the present invention.

FIG. 9 is a flow chart showing a flow for determining a penetration force of post injection fuel according to a fourth embodiment of the present invention.

FIG. 10 is a view showing the relation among an engine rotation speed, an amount of fuel injection with a small penetration force, and an amount of fuel injection with a large penetration force in the post injection.

FIG. 11A is a time chart showing a change over time of an injection rate of fuel in a second region R2 in the case where the engine rotation speed is low.

FIG. 11B is a time chart showing a change over time of an injection rate of fuel in the second region R2 in the case where the engine rotation speed is high.

FIG. 12 is a flow chart showing a flow for determining a penetration force of post injection fuel according to a fifth embodiment of the present invention.

DESCRIPTION OF EMBODIMENTS

Hereinafter, the best modes for carrying out the present invention will be exemplarily described in detail based on preferred embodiments with reference to the attached drawings. However, the dimensions, materials, shapes, relative arrangements and so on of component parts described in the embodiments are not intended to limit the scope of the present invention to these alone in particular as long as there are no specific statements.

First Embodiment

FIG. 1 is a view showing the schematic construction of an internal combustion engine 1 according to a first embodiment of the present invention. Here, note that in this embodiment, in order to illustrate the internal combustion engine 1 in a simple and concise manner, a part of components thereof is omitted. The internal combustion engine 1 is a diesel engine. The internal combustion engine 1 is installed on a vehicle, for example. A piston 3 is fitted in a cylinder (each cylinder) 2 of the internal combustion engine 1. On an upper surface of the piston 3, there is formed a cavity 31 which is concaved toward the inside of the piston 3.

On the internal combustion engine 1, there is mounted a fuel injection valve 4 for injecting fuel into the cylinder 2. The fuel injection valve 4 is connected to a common rail 5, and the common rail 5 is in communication with a fuel pump 7 through a fuel supply pipe 6. A pressure adjusting mechanism 8 is provided on the fuel injection valve 4, wherein the pressure of fuel is adjusted by the pressure adjusting mechanism 8. Here, note that in this embodiment, the pressure of fuel injected from the fuel injection valve 4 need only be able to be adjusted, and so instead of adjusting the pressure of fuel by means of the pressure regulation mechanism 8, the pressure of fuel may be adjusted by changing the coefficient of compressibility (or compression ratio) of the fuel in the fuel pump 7. In addition, a mechanism for adjusting the pressure of fuel may be provided on the common rail 5, so that the pressure of fuel can be adjusted in the common rail 5. Such a construction as to be able to adjust the pressure of fuel is well-known, and hence an explanation thereof is omitted.

The fuel injection valve 4 is provided with a needle 42 for opening and closing a nozzle hole 41, and a valve operating mechanism or valve train 43 for driving the needle 42 to move up and down. As the fuel injection valve 4, there can be adopted a fuel injection valve of a close coupled or direct drive type, for example. The valve operating mechanism 43 is provided with a piezo-electric element, for example, and the needle 42 is opened by electrically energizing this piezo-electric element. Here, note that in this embodiment, the fuel injection valve 4 need only be provided with a mechanism for driving the needle 42 to move up and down, as well as changing the valve opening speed of the needle 42. Such a construction as to be able to change the valve opening speed of the needle 42 is well-known, and hence an explanation thereof is omitted. In addition, the fuel injection valve 4 according to this embodiment is assumed to be constructed in such a manner that the valve opening speed of the needle 42 is able to be changed to at least three levels. The fuel injection valve 4 may be one in which the valve opening speed of the needle 42 can be changed in a stepless manner.

In the internal combustion engine 1 constructed as stated above, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements. In addition, an accelerator opening sensor 17, which serves to detect an engine load by outputting an electrical signal corresponding to an amount by which a driver depressed an accelerator pedal, and a crank position sensor 18, which serves to detect the engine rotation speed, are connected to the ECU 10 through electrical wiring, and the output signals of these various kinds of sensors are inputted to the ECU 10. On the other hand, the pressure adjusting mechanism 8 and the value operating mechanism 43 are connected to the ECU 10 through electrical wiring, so that these mechanisms 8, 43 are controlled by means of the ECU 10. Here, note that the ECU 10 controls the value operating mechanism 43 of the fuel injection valve 4, but in the following, it is assumed that the ECU 10 controls the fuel injection valve 4. The ECU 10 adjusts the pressure of fuel by operating the pressure adjusting mechanism 8. Moreover, the ECU 10 adjusts the valve opening speed of the needle 42 by operating the value operating mechanism 43.

The ECU 10 decides the amount of fuel injection, the fuel injection timing and the pressure of fuel from the fuel injection valve 4, based on the operating state of the internal combustion engine 1 (e.g., the engine rotation speed and the accelerator opening degree). Here, note that the relation among the operating state of the internal combustion engine 1, the amount of fuel injection, the fuel injection timing and the pressure of fuel has been beforehand obtained through experiments, etc., made into a map, and stored in the ECU 10. This map is set in such a manner that the air fuel ratio in the cylinder becomes a target air fuel ratio, wherein this target air fuel ratio is an air fuel ratio set according to the operating state of the internal combustion engine 1 (e.g., the engine rotation speed and the accelerator opening degree).

Here, in the internal combustion engine 1 according to this embodiment, a post injection is carried out after a main injection in at least a part of an operating region thereof. The post injection is a fuel injection which is carried out in a second or later half of combustion when fuel injected at the time of the main injection (hereinafter, referred to as a main injection fuel) is in combustion. Accordingly, the post injection is carried out at the time when fuel injected at the time of the post injection (hereinafter, referred to as a post injection fuel) is able to be combusted by the combustion gas of the main injection fuel. The time to carry out the post injection may be decided so that the fuel supplied by the post injection can be injected into the cavity 31. The post injection is carried out, for example, in order to suppress the generation of smoke.

Here, in the diesel engine, the main injection fuel may combust while staying in the cylinder at a cylinder wall surface side. Then, the larger the penetration force of the post injection fuel, the farther away and the more quickly the post injection fuel reaches, so that the combustion gas staying at the cylinder wall surface side can be quickly perturbed or agitated by the post injection fuel. As a result of this, the mixing of fuel and air can be promoted, thus making it possible to enhance the combustion speed or rate thereof. For this reason, the period of combustion can be shortened, so that the degree of constant volume can be improved, as a result of which fuel economy can be improved. In addition, the re-oxidation of soot can be promoted by the promotion of the combustion, so that the generation of smoke can also be made to decrease. The decrease in the generation of smoke can generate a much larger amount of heat, so that fuel economy can also be thereby improved. The effect of such a post injection becomes more remarkable by making the penetration force of the post injection fuel large.

On the other hand, by making small the penetration force of the post injection fuel, smoke may be able to be reduced, and fuel economy may be able to be improved. In this case, the fuel with a small penetration force combusts at the cylinder center side. Here, in the diesel engine, when the main injection fuel mainly combusts at the cylinder wall surface side, the concentration of oxygen is higher at the cylinder center side than at the cylinder wall surface side. In this case, by making small the penetration force of the post injection fuel, the post injection fuel can be made to combust more at the cylinder center side where the concentration of oxygen is high. Thus, by utilizing the oxygen remaining in the cylinder 2 in an efficient manner, smoke can be reduced and fuel economy can be improved.

Then, in this embodiment, the penetration force of fuel is adjusted by adjusting the valve opening speed of the needle 42. Here, when the needle 42 of the fuel injection valve 4 has been closed, a passage for fuel is blocked by the needle 42 being in contact with the inner wall surface of the fuel injection valve 4. At this time, fuel can not pass through between the needle 42 and the inner wall surface of the fuel injection valve 4. On the other hand, in an early stage in which the needle 42 of the fuel injection valve 4 is opened, the needle 42 moves away from the inner wall surface of the fuel injection valve 4, so that the distance between the needle 42 and the inner wall surface of the fuel injection valve 4 increases gradually. That is, the distance between a tip end portion of the needle 42 and the inner wall surface of the fuel injection valve 4 becomes larger as the tip end portion of the needle 42 goes up. For this reason, the cross-sectional area of the passage for the fuel in the fuel injection valve 4 increases gradually. The larger the cross-sectional area of the passage for fuel, the larger becomes the amount of fuel which is able to flow per unit time, so that the amount of fuel injection per unit time increases. Then, the larger the amount of fuel injection per unit time, the larger becomes the penetration force of the fuel, so that the fuel can reach farther away and more quickly. Accordingly, the cross-sectional area of the passage for the fuel can be increased in a quick manner by making the valve opening speed of the needle 42 high, so that the penetration force of the fuel can be made large in a quick manner. For this reason, the agitation of the combustion gas can be promoted.

On the other hand, by making low the valve opening speed of the needle 42, the cross-sectional area of the passage for fuel in the fuel injection valve 4 increases gradually, so that the period of time in which the amount of fuel injection per unit time is small becomes long. That is, the period of time in which the penetration force of fuel is small becomes long. Then, by injecting fuel with a small penetration force, the fuel can be made to combust at the cylinder center side. That is, by making small the penetration force of the post injection fuel, the post injection fuel can be made to combust more at the cylinder center side where the concentration of oxygen is high.

Here, note that after an amount of lift of the needle 42 becomes large to some extent, the amount of fuel injection per unit time becomes constant, so that the penetration force of fuel becomes the same or constant irrespective of the valve opening speed of the needle 42. That is, in the period of time until the amount of lift of the needle 42 becomes large to some extent, the penetration force of fuel changes according to the valve opening speed of the needle 42, but after the amount of lift of the needle 42 has become large to some extent, the penetration force of fuel becomes constant, irrespective of the valve opening speed of the needle 42. In the post injection, the amount of injection of fuel is relatively small, so the needle 42 is often closed before the amount of lift of the needle 42 becomes large to some extent. That is, the needle 42 fluctuates or moves up and down in a range in which there is a correlation between the valve opening speed of the needle 42 and the penetration force of fuel. Accordingly, by adjusting the valve opening speed of the needle 42, it is possible to adjust the penetration force of fuel. Here, note that even if the amount of fuel injection per unit time has become constant in the course of the post injection, the valve opening speed of the needle 42 and the penetration force of fuel have a correlation until then, and hence, the effect or advantage as mentioned above in this embodiment can be obtained.

In addition, even if the valve opening speed of the needle 42 is made high, fuel injected in the early stage of the post injection has a small penetration force, so the fuel combusts at the cylinder center side. For this reason, even if the valve opening speed of the needle 42 is made high, a bit of the effect of making use of the oxygen at the cylinder center side can be obtained. On the other hand, even if the valve opening speed of the needle 42 is made low, the penetration force of fuel becomes large after the amount of lift of the needle 42 has become large to some extent, so that the combustion gas is perturbed or agitated. For this reason, even if the valve opening speed of the needle 42 is made low, a bit of the effect due to the agitation of the combustion gas can be obtained. Accordingly, the effect due to the agitation of the combustion gas and the effect due to the use of the oxygen at the cylinder center side can each be obtained, irrespective of the valve opening speed of the needle 42. By making the valve opening speed of the needle 42 high, the effect due to the agitation of the combustion gas becomes more remarkable, whereas by making the valve opening speed of the needle 42 low, the effect due to the use of the oxygen at the cylinder center side becomes more remarkable.

Here, it is decided according to the operating state of the internal combustion engine 1, whether a greater effect can be obtained in the case where the penetration force of fuel at the time of the post injection is made large, or in the case where it is made small. For example, the higher the engine rotation speed, the shorter becomes a period of time after the main injection is carried out until the exhaust valve opens. For this reason, a period of time in which the combustion gas stays in the cylinder 2 becomes shorter, so a period of time in which the re-oxidation of soot is carried out becomes shorter. Here, if the penetration force of fuel at the time of the post injection is made small at the time when the rotational speed of the internal combustion engine 1 is high, the fuel supplied by the post injection can combust at the cylinder center side, but the re-oxidation of soot in the combustion gas of the fuel supplied by the main injection becomes slow, thus giving rise to a fear that smoke may be generated. Accordingly, in cases where the engine rotation speed is high, the amount of discharge of smoke becomes smaller when the re-oxidation of soot is promoted by carrying out the agitation of the combustion gas thereby to increase the combustion speed thereof. On the other hand, in cases where the engine rotation speed is low, it is easy to secure a period of time in which the re-oxidation of soot is carried out, and hence, even if the penetration force of fuel at the time of the post injection is made large, the effect obtained will be small. For this reason, in cases where the engine rotation speed is low, the amount of discharge of smoke becomes smaller when the oxygen at the cylinder center side is utilized. Accordingly, in this embodiment, the penetration force of fuel at the time of the post injection is decided according to the engine rotation speed.

Here, FIG. 2 is a view showing the relation among the engine rotation speed, the amount of fuel injection, a region in which a post injection is carried out. In FIG. 2, an axis of abscissa represents the engine rotation speed, and an axis of ordinate represents the amount of fuel injection, but may represent engine torque in place of the amount of fuel injection. An alternate long and short dash line indicates a full load. The post injection is carried out in operating regions in which the engine rotation speed is equal to or more than NE1, and at the same time is equal to or less than NE4, and the amount of fuel injection is equal to or more than Q1, and at the same time is equal to or less than Q2. The post injection is mainly carried out in the operating regions in which smoke tends to occur. Among the operating regions in which the post injection is carried out, a region in which the engine rotation speed is equal to or more than NE1 and at the same time is less than NE2 is set as a first region R1; a region in which the engine rotation speed is equal to or more than NE2 and at the same time is less than NE3 is set as a second region R2; and a region in which the engine rotation speed is equal to or more than NE3 and at the same time is equal to or less than NE4 is set as a third region R3.

The first region R1 is an operating region in which the engine rotation speed is relatively low, among the operating regions in which the post injection is carried out. For this reason, in the first region R1, the effect of reducing smoke and improving fuel economy becomes larger when the use of the oxygen at the cylinder center side is promoted, than when the perturbation or agitation of fuel is promoted, at the time of the post injection. Accordingly, in the first region R1, the use of the oxygen at the cylinder center side is promoted by making the penetration force of the post injection fuel smaller than the penetration force of the main injection fuel. On the other hand, the third region R3 is an operating region in which the engine rotation speed is relatively high, among the operating regions in which the post injection is carried out. For this reason, in the third region R3, the effect of reducing smoke and improving fuel economy becomes larger when the perturbation or agitation of fuel is promoted, than when the use of the oxygen at the cylinder center side is promoted, at the time of the post injection. Accordingly, in the third region R3, the perturbation or agitation of the combustion gas is promoted by making the penetration force of the post injection fuel larger than the penetration force of the main injection fuel. The second region R2 is an operating region in which the engine rotation speed is about medium, among the operating regions in which the post injection is carried out. In the second region R2, the post injection is carried out by being divided into two sub-injections. Here, note that in this embodiment, NE2 corresponds to a second predetermined speed in the present invention, and NE3 corresponds to a first predetermined speed in the present invention.

In the second region R2, both of the effect due to the agitation of the combustion gas, and the effect due to the use of the oxygen at the cylinder center side can be obtained. For this reason, at the time of carrying out a first post injection (hereinafter, also referred to as a first post sub-injection), the valve opening speed of the needle 42 is made lower than that in the main injection, and at the time of carrying out a second post injection (hereinafter, also referred to as a second post sub-injection), the valve opening speed of the needle 42 is made higher than that in the main injection. That is, in the first post sub-injection, the penetration force of fuel is made smaller than that in the main injection, and in the second post sub-injection, the penetration force of fuel is made larger than that in the main injection. Here, note that the penetration force of fuel may be larger in the first post sub-injection than in the second post sub-injection, or vice versa. That is, in the first post sub-injection, the penetration force of fuel can be made larger than that in the main injection, and in the second post sub-injection, the penetration force of fuel can be made smaller than that in the main injection. However, it is considered that immediately after the main fuel injection has been made, the main injection fuel combusts at the cylinder wall surface side, and a relatively large amount of oxygen remains at the cylinder center side. For this reason, in the first post sub-injection, the oxygen remaining at the cylinder center side can be more effectively utilized by making the penetration force of fuel lower than that in the main injection.

The amount of fuel injection in the first post sub-injection (hereinafter, also referred to as the amount of the first post sub-injection) and the amount of fuel injection in the second post sub-injection (hereinafter, also referred to as the amount of the second post sub-injection) have been obtained in advance by experiments, simulations, or the like. Here, note that the ratio between the amount of the first post sub-injection and the amount of the second post sub-injection may be a fixed value, or may be made to change according to the operating state of the internal combustion engine. For example, the amount of post injection may be equally divided into two, so that the amount of the first post sub-injection and the amount of the second post sub-injection become the same value. In this manner, the effect due to the agitation of the fuel and the effect of making use of the oxygen at the cylinder center side can be obtained, respectively, so that smoke can be reduced and fuel economy can be improved, in comparison with the case where the post injection is not divided. Here, note that NE1, NE2, NE3, NE4, Q1 and Q2 can be obtained in advance by experiments, simulations, or the like, as values to suppress the generation of smoke as well as to improve fuel economy.

FIGS. 3A through 3C are time charts showing changes over time of the amount of lift of the needle 42 in the fuel injection valve 4. FIG. 3A shows the case of the first region R1, FIG. 3B shows the case of the second region R2, and FIG. 3C shows the case of the third region R3. In FIGS. 3A through 3C, a pilot injection is carried out before the main injection, and the post injection is carried out after the main injection. When the valve opening speed of the needle 42 is high, the slope of the amount of lift in each of FIGS. 3A through 3C becomes large.

In this embodiment, as shown in FIG. 3A, in the post injection of the first region R1, the slope of the amount of lift of the needle 42 is small, and the penetration force of fuel is small. On the other hand, as shown in FIG. 3C, in the post injection of the third region R3, the slope of the amount of lift is larger than that in the post injection of the first region R1, and the penetration force of fuel is large. Moreover, as shown in FIG. 3B, in the post injection of the second region R2, the slope of the amount of lift in the first post sub-injection is smaller than that in the main injection, and the penetration force of fuel is small. Further, the slope of the amount of lift in the second post sub-injection is larger than that in the main injection, and the penetration force of fuel is large.

FIG. 4 is a flow chart showing a flow or routine for determining the penetration force of the post injection fuel according to this first embodiment of the present invention. The routine in this flow chart is carried out by means of the ECU 10 at each combustion cycle. Here, note that in this embodiment, the ECU 10, which carries out the flow or routine of the flow chart shown in FIG. 4, corresponds to a controller in the present invention.

In step S101, the operating state of the internal combustion engine 1 is detected. In this step, the engine rotation speed and the amount of fuel injection are detected. Because the amount of fuel injection is in the correlation with the accelerator opening degree, the accelerator opening degree may be detected in place of the amount of fuel injection. Here, note that the amount of fuel injection is an amount of fuel which is a sum of the amount of the pilot injection, the amount of the main injection, and the amount of the post injection. The engine rotation speed and the amount of fuel injection are utilized at the time of obtaining the operating region of the internal combustion engine 1. When the processing of step S101 is completed, the routine goes to step S102.

In step S102, it is determined whether the amount of fuel injection is in a region in which a post injection is carried out. That is, it is determined whether the amount of fuel injection is equal to or more than Q1 and is equal to or less than Q2 in FIG. 2. Here, note that the region in which the post operation is carried out has been obtained in advance through experiments, simulations or the like. In cases where an affirmative determination is made in step S102, the routine goes to step S103, whereas in cases where a negative determination is made, this routine is ended. Here, note that in cases where a negative determination is made in step S102, the post injection is not carried out.

In step S103, it is determined whether the engine rotation speed is in a region in which the post injection is carried out. That is, it is determined whether the engine rotation speed is equal to or more than NE1 and is equal to or less than NE4 in FIG. 2. In cases where an affirmative determination is made in step S103, the routine goes to step S104, whereas in cases where a negative determination is made, this routine is ended. Here, note that in cases where a negative determination is made in step S103, the post injection is not carried out.

In step S104, it is determined whether the engine rotation speed is lower than a lower limit value of the second region R2. That is, it is determined whether the engine rotation speed is lower than NE2 in FIG. 2. In this step, it is determined whether the operating region of the internal combustion engine 1 is the first region R1. In cases where an affirmative determination is made in step S103, the operating region of the internal combustion engine 1 is the first region R1, whereas in cases where a negative determination is made, the operating region of the internal combustion engine 1 is the second region R2 or the third region R3. In cases where an affirmative determination is made in step S104, the routine goes to step S105, where the penetration force of the post injection fuel is made small. In this step S105, the valve opening speed of the needle 42 at the time of the post injection is set to be lower than the valve opening speed of the needle 42 at the time of the main injection. That is, in this step, the valve opening speed of the needle 42 at the time of the post injection is set to a value corresponding to the first region R1. When the processing of step S105 ends, this routine is ended.

On the other hand, in cases where a negative determination is made in step S104, the routine goes to step S106. In step S106, it is determined whether the engine rotation speed is equal to or more than a lower limit value of the third region R3. That is, it is determined whether the engine rotation speed is equal to or more than NE3 in FIG. 2. In this step, it is determined whether the operating region of the internal combustion engine 1 is the third region R3. In cases where an affirmative determination is made in step S106, the operating region of the internal combustion engine 1 is the third region R3, whereas in cases where a negative determination is made, the operating region of the internal combustion engine 1 is the second region R2.

In cases where an affirmative determination is made in step S106, the routine goes to step S107, where the penetration force of the post injection fuel is made large. In this step S107, the valve opening speed of the needle 42 at the time of the post injection is set to be higher than the valve opening speed of the needle 42 at the time of the main injection. That is, in this step, the valve opening speed of the needle 42 at the time of the post injection is set to a value corresponding to the third region R3. When the processing of step S107 ends, this routine is ended.

In addition, in cases where a negative determination is made in step S106, the routine goes to step S108, where the post injection fuel is carried out by being divided into two. The valve opening speed of the needle 42 at the time of the first post sub-injection is made lower than the valve opening speed of the needle 42 at the time of the main injection, and the valve opening speed of the needle 42 at the time of the second post sub-injection is made higher than the valve opening speed of the needle 42 at the time of the main injection. That is, in this step, the post injection corresponding to the second region R2 is carried out. When the processing of step S108 ends, this routine is ended.

Here, note that in this embodiment, the operating region in which the post injection is carried out is divided into the first region R1, the second region R2 and the third region R3, but the second region R2 can be not provided, either. That is, that operating region may be divided into the first region R1 in which the penetration force of the post injection fuel is made smaller than the penetration force of the main injection fuel, and the third region R3 in which the penetration force of the post injection fuel is made larger than the penetration force of the main injection fuel. FIG. 5 is a view showing the relation among the engine rotation speed, the amount of fuel injection, the region in which the post injection is carried out, in the case where the first region R1 and the third region R3 are provided. In FIG. 5, an axis of abscissa represents the engine rotation speed, and an axis of ordinate represents the amount of fuel injection, but may represent engine torque in place of the amount of fuel injection. An alternate long and short dash line indicates a full load. The post injection is carried out in operating regions in which the engine rotation speed is equal to or more than NE1, and at the same time is equal to or less than NE4, and the amount of fuel injection is equal to or more than Q1, and at the same time is equal to or less than Q2. Among the operating regions in which the post injection is carried out, a region in which the engine rotation speed is equal to or more than NE1 and at the same time is less than NE2 (this may be NE3) is set as a first region R1, and a region in which the engine rotation speed is equal to or more than NE2 (this may be NE3) and at the same time is equal to or less than NE4 is set as a third region R3. Thus, even in cases where the second region R2 is not provided, the use of the oxygen at the cylinder center side can be promoted by making the penetration force of the post injection fuel smaller than the penetration force of the main injection fuel, in the first region R1. Moreover, the agitation of the combustion gas can be promoted by making the penetration force of the post injection fuel larger than the penetration force of the main injection fuel, in the third region R3. As a result, the generation of smoke can be reduced, and fuel economy can be improved.

Here, in cases where the second region R2 is not provided, it is considered that NE2 and NE3 are equal to each other, and the step S106 and the step S108 in the flow chart shown in FIG. 4 are not carried out. Then, in cases where a negative determination is made in step S104, the routine goes to step S107.

Note that in this embodiment, reference is made to the case where the penetration force of the post injection fuel is made higher than the penetration force of the main injection fuel, and the case where the penetration force of the post injection fuel is made lower than the penetration force of the main injection fuel. That is, the penetration force of fuel in combination with the main injection has three kinds of cases in all, and the valve opening speed of the needle 42 is changed to three levels. On the other hand, in the case of using the fuel injection valve 4 in which the valve opening speed of the needle 42 can be changed to four or more levels or in a stepless manner, the valve opening speed of the needle 42 may be changed to four or more levels, or may be changed in a stepless manner, instead of changing the valve opening speed of the needle 42 to three levels. Then, the valve opening speed of the needle 42 may also be increased in such a manner that the higher the engine rotation speed, the higher becomes the penetration force of the post injection fuel. In this case, it is not necessary to provide the second region R2, as shown in FIG. 5.

For example, in cases where the engine rotation speed is lower than NE2 (this also may be NE3), the penetration force of the post injection fuel is made lower than the penetration force of the main injection fuel, and the penetration force of the post injection fuel is made higher in accordance with the increasing engine rotation speed. In addition, in cases where the engine rotation speed is equal to or more than NE2 (this also may be NE3), the penetration force of the post injection fuel is made higher than the penetration force of the main injection fuel, and the penetration force of the post injection fuel is made higher in accordance with the increasing engine rotation speed. Moreover, the penetration force of the post injection fuel may also be simply made higher in accordance with the increasing engine rotation speed, without dividing the operating region in which the post injection is carried out into the first region R1, the second region R2 and the third region R3. Here, as stated above, the higher the rotation speed of the internal combustion engine, the shorter becomes the period of time in which the re-oxidation of soot is carried out. Then, the higher the rotation speed of the internal combustion engine, the shorter becomes the period of time in which the re-oxidation of soot is carried out, so that the generation of smoke can be suppressed more by making large the effect of promoting the re-oxidation of soot. On the other hand, the lower the engine rotation speed, the larger becomes the effect of making use of the oxygen at the cylinder center side. That is, at the time of the post injection, the higher the rotation speed of the internal combustion engine, the larger the penetration force of fuel is made, whereas the lower the rotation speed of the internal combustion engine, the smaller the penetration force of fuel is made, whereby the effect of the post injection can be made much larger.

Further, in cases where the second region R2 is provided, only in the first region R1 and the third region R3, the penetration force of fuel may also be made larger in accordance with the increasing engine rotation speed. In addition, in at least one of the first region R1, the second region R2 and the third region R3, the penetration force of the post injection fuel may also be made larger in accordance with the increasing engine rotation speed. Moreover, in the second region R2, the penetration force of either one of the post sub-injections may be changed according to the number of engine revolutions per unit time, or the penetration forces of both of the post sub-injections may be changed according to the number of engine revolutions per unit time. In this manner, by making the penetration force of fuel larger in accordance with the increasing engine rotation speed, it is possible to set an appropriate penetration force of fuel for the purpose of suppressing the generation of smoke or improving fuel consumption.

As explained above, in this embodiment, the penetration force of fuel is adjusted by changing the valve opening speed of the needle 42 in accordance with the operating region of the internal combustion engine 1. In addition, the agitation of the combustion gas can be promoted by making the penetration force of the post injection fuel larger than the penetration force of the main injection fuel, when the engine rotation speed is high. According to this, it becomes possible to carry out the promotion of combustion, so that the generation of smoke can be suppressed, and fuel economy can be improved. On the other hand, the use of the oxygen at the cylinder center side can be promoted by making the penetration force of the post injection fuel smaller than the penetration force of the main injection fuel, when the engine rotation speed is low. As a result of this, it becomes possible to perform the promotion of combustion, whereby the generation of smoke can be suppressed, and fuel economy can be improved.

Here, note that in this embodiment, the post injection is carried out by being divided into two sub-injections in the second region R2, but in the first region R1, too, the post injection can also be carried out by being divided into two or more sub-injections. Here, even if the valve opening speed of the needle 42 is made low, the amount of lift of the needle 42 becomes large when the valve opening time becomes long, so that the cross-sectional area of the passage for the fuel in the fuel injection valve 4 becomes large. As a result, the penetration force of the fuel becomes large. On the other hand, the first post injection is made to end before the penetration force of the fuel becomes large, and thereafter, the second post sub-injection is carried out, whereby fuel of a small penetration force can be injected again in the second post sub-injection. Accordingly, it becomes possible to inject a larger amount of fuel with a small penetration force as a whole, so that the use of the oxygen at the cylinder center side can be further promoted. Moreover, even in any region, the post injection may be carried out by being divided into two or more sub-injections, according to the amount of post injection.

In addition, in this embodiment, the penetration force of the post injection fuel is changed according to the number of engine revolutions per unit time, but the penetration force of the post injection fuel may further be made to change in consideration of the amount of fuel injection (this also may be the engine load or engine torque). Similarly, in consideration of the amount of fuel injection, whether the post injection is to be divided may be decided, or the frequency (number of times) of division of the post injection may be decided. The relation of the engine rotation speed and the amount of fuel injection with the penetration force of the post injection fuel, the frequency of division, and the amount of the post injection fuel may have been obtained in advance through experiments, simulations or the like, and made into a map. Moreover, in this embodiment, the explanation has been made on the assumption that the fuel injection valve 4 is arranged on the central axis of the cylinder 2, and hence, as the effect of making low the penetration force of the fuel at the time of the post injection, there has been mentioned that the oxygen at the cylinder center side is utilized, but the fuel injection valve 4 may not be arranged on the central axis of the cylinder 2. In such a case, too, the concentration of oxygen is high near the fuel injection valve 4, so that by making small the penetration force of fuel at the time of the post injection, the fuel supplied by the post injection can be made to combust in a location where the concentration of oxygen is high.

Second Embodiment

In this second embodiment, reference will be made to the control in the case where at the time of the post injection, the valve opening speed of the needle 42 is made to change in a stepless manner according to the engine rotation speed. The devices, parts and so on in this second embodiment other than this control are the same as those in the first embodiment, so the explanation thereof is omitted. FIG. 6 is a flow chart showing a flow or routine for determining the penetration force of the post injection fuel according to this second embodiment of the present invention. The routine in this flow chart is carried out by means of the ECU 10 at each combustion cycle. For those steps in which the same processings as in the aforementioned flow chart in FIG. 4 are carried out, the same symbols are attached and the explanation thereof is omitted. Here, note that in this second embodiment, the ECU 10, which carries out the flow or routine of the flow chart shown in FIG. 6, corresponds to the controller in the present invention.

In the flow chart shown in FIG. 6, in cases where an affirmative determination is made in step S103, the routine goes to step S201. In step S201, the penetration force of fuel at the time of the post injection is set according to the engine rotation speed. That is, the valve opening speed of the needle 42 in the fuel injection valve 4 at the time of the post injection is set according to the engine rotation speed. The relation between the engine rotation speed and the valve opening speed of the needle 42 at the time of the post injection has been obtained by experiments, simulations, or the like in advance, so that the suppression of smoke and the improvement in fuel economy can be achieved. Such a relation may have been made into a map in advance. In step S201, the valve opening speed of the needle 42 at the time of the post injection is set to become higher in accordance with the increasing engine rotation speed. In addition, when the engine rotation speed is at a low side, the penetration force of the post injection fuel is made smaller than the penetration force of the main injection fuel, whereas when the engine rotation speed is at a high side, the penetration force of the post injection fuel is made larger than the penetration force of the main injection fuel. When the processing of step S201 ends, this routine is ended. In this manner, the penetration force of fuel is adjusted by changing the valve opening speed of the needle 42 in a stepless manner in accordance with the operating region of the internal combustion engine 1, too.

Third Embodiment

In the above-mentioned first embodiment, the penetration force of fuel is adjusted by adjusting the valve opening speed of the needle 42. On the other hand, in this third embodiment, the penetration force of fuel can be adjusted by adjusting the pressure of the fuel. The devices, parts and so on other than this are the same as those in the abovementioned embodiments, so the explanation thereof is omitted. As explained in the first embodiment, the pressure of fuel may be adjusted by any of the pressure adjusting mechanism 8, the fuel pump 7, and the common rail 5.

Here, the penetration force of fuel changes according to the valve opening speed of the needle 42, but it also changes according to the pressure of fuel, too. That is, the higher the pressure of fuel, the more the amount of fuel injection per unit time increases, and the larger the penetration force of fuel becomes. Accordingly, the penetration force of fuel can be made low by making the pressure of fuel at the time of the post injection lower than that at the main injection, in the first region R1. As a result of this, it is possible to promote the use of oxygen at the cylinder center side. On the other hand, the penetration force of fuel can be made high by making the pressure of fuel at the time of the post injection higher than that at the main injection, in the third region R3. As a result of this, the agitation of the combustion gas can be promoted. Here, note that in the internal combustion engine 1 according to this third embodiment, the higher the engine rotation speed, the higher the pressure of fuel at the time of the main injection becomes. In this third embodiment, the pressure of fuel at the time of the post injection is made higher or lower with respect to the pressure of fuel at the time of the main injection which changes according to the engine rotation speed.

In addition, in the second region R2, the post injection is divided into two post sub-injections, wherein the pressure of fuel at the time of one post sub-injection is made higher than the pressure of fuel at the time of the other post sub-injection. For example, the pressure of fuel at the time of a first post sub-injection is made the same as the pressure of fuel at the time of the main injection, and the pressure of fuel at the time of a second post sub-injection is made higher than the pressure of fuel at the time of the main injection. Here, note that these relations may be opposite. Moreover, the pressure of fuel at the time of one post sub-injection is made lower than the pressure of fuel at the time of the main injection, and the pressure of fuel at the time of the other post sub-injection is made the same as the pressure of fuel at the time of the main injection. Further, the pressure of fuel at the time of one post sub-injection is made lower than the pressure of fuel at the time of the main injection, and the pressure of fuel at the time of the other post sub-injection is made higher than the pressure of fuel at the time of the main injection. In this manner, it is possible to set the penetration force of fuel according to the engine rotation speed. The pressure of fuel and the amount of fuel injection in each post sub-injection can be obtained by experiments, simulations, or the like in advance.

The amount of fuel injection at the time of the post injection in the second region R2 can be considered similarly as in the first embodiment. In addition, the penetration force of the post injection fuel can be considered similarly as in the first embodiment, and can be accordingly changed. That is, the second region R2 may not be provided, either, or in the operating region in which the post injection is carried out, the penetration force of the post injection fuel can also be made higher in accordance with the increasing engine rotation speed.

FIGS. 7A through 7C are time charts showing changes over time of the pressure of fuel and an injection rate of fuel. The injection rate of fuel is an amount of injection of fuel per unit time. FIG. 7A shows the case of the first region R1, FIG. 7B shows the case of the second region R2, and FIG. 7C shows the case of the third region R3. In FIGS. 7A through 7C, a pilot injection is carried out before the main injection, and the post injection is carried out after the main injection.

As shown in FIG. 7A, in the post injection of the first region R1, the pressure of fuel is decreased after the main injection has been completed and before the post injection is started, and the pressure of fuel is restored to an original or initial level after the post injection has been completed. For this reason, the pressure of fuel at the time of the post injection is lower than the pressure of fuel at the time of the main injection. Then, when the pressure of fuel is decreased at the time of the post injection, the injection rate of the post injection fuel becomes high gradually, and the penetration force of fuel becomes low.

On the other hand, as shown in FIG. 7C, in the post injection of the third region R3, the pressure of fuel is increased after the main injection has been completed and before the post injection is started, and the pressure of fuel is restored to the original or initial level after the post injection has been completed. For this reason, the pressure of fuel at the time of the post injection is higher than the pressure of fuel at the time of the main injection. Then, when the pressure of fuel is increased at the time of the post injection, the injection rate of the post injection fuel becomes high rapidly, and the penetration force of fuel becomes high.

Further, as shown in FIG. 7B, in the second region R2, the post injection is divided into two (i.e., a first and a second post sub-injections), wherein the pressure of fuel is increased after the first post sub-injection has been completed and before the second post sub-injection is started, and the pressure of fuel is restored to the original or initial level after the second post sub-injection has been completed. That is, the penetration force of second post sub-injection fuel is made larger than the penetration force of first post sub-injection fuel.

Here, note that the pressure of fuel at the time of the post injection in each region has been obtained by experiments, simulations, or the like in advance, so that the suppression of smoke and the improvement in fuel economy can be achieved.

FIG. 8 is a flow chart showing a flow or routine for determining the penetration force of the post injection fuel according to this third embodiment of the present invention. The routine in this flow chart is carried out by means of the ECU 10 at each combustion cycle. For those steps in which the same processings as in the aforementioned flow charts are carried out, the same symbols are attached and the explanation thereof is omitted. Here, note that in this third embodiment, the ECU 10, which carries out the flow or routine of the flow chart shown in FIG. 8, corresponds to the controller in the present invention.

In the flow chart shown in FIG. 8, in cases where an affirmative determination is made in step S104, the routine goes to step S301, where the penetration force of fuel at the time of the post injection is made low. In this step S301, the pressure of fuel at the time of the post injection is set to be lower than the pressure of fuel at the time of the main injection. That is, in this step, at the time of the post injection, the pressure of fuel is set to a value corresponding to the first region R1. When the processing of step S301 ends, this routine is ended.

In addition, in cases where an affirmative determination is made in step S106, the routine goes to step S302, where the penetration force of fuel at the time of the post injection is made large. In this step S302, the pressure of fuel at the time of the post injection is set to be higher than the pressure of fuel at the time of the main injection. That is, in this step, at the time of the post injection, the pressure of fuel is set to a value corresponding to the third region R3. When the processing of step S302 ends, this routine is ended.

On the other hand, in cases where a negative determination is made in step S106, the routine goes to step S303, where the post injection fuel is carried out by being divided into two post sub-injections. At this time, for example, the pressure of fuel at the time of one post sub-injection is made the same as the pressure of fuel at the time of the main injection, and the pressure of fuel at the time of the other post sub-injection is made higher than the pressure of fuel at the time of the main injection. That is, in this step, the post injection corresponding to the second region R2 is carried out. When the processing of step S303 ends, this routine is ended.

Here, note that in cases where the second region R2 is not provided, it is considered that NE2 and NE3 are equal to each other, and in cases where a negative determination is made in step S104, the routine advances to step S302. In this case, the steps S106 through S303 are not carried out.

As explained above, in this third embodiment, the penetration force of fuel is adjusted by adjusting the pressure of fuel at the time of the post injection. In addition, the agitation of the combustion gas can be promoted by making the penetration force of fuel, when the engine rotation speed is high. As a result of this, it becomes possible to perform the promotion of combustion, whereby the generation of smoke can be suppressed, and fuel economy can be improved. On the other hand, the use of the oxygen at the cylinder center side can be promoted by making the penetration force of fuel small, when the engine rotation speed is low. As a result of this, it becomes possible to perform the promotion of combustion, whereby the generation of smoke can be suppressed, and fuel economy can be improved.

Fourth Embodiment

In this fourth embodiment, reference will be made to the control in the case where during the time of the post injection, the pressure of fuel at the time of the post injection is made to change in a stepless manner according to the engine rotation speed. The devices, parts and so on other than this are the same as those in the above-mentioned embodiments, so the explanation thereof is omitted. FIG. 9 is a flow chart showing a flow or routine for determining the penetration force of the post injection fuel according to this fourth embodiment of the present invention. The routine in this flow chart is carried out by means of the ECU 10 at each combustion cycle. For those steps in which the same processings as in the aforementioned flow charts are carried out, the same symbols are attached and the explanation thereof is omitted. Here, note that in this fourth embodiment, the ECU 10, which carries out the flow or routine of the flow chart shown in FIG. 9, corresponds to the controller in the present invention.

In the flow chart shown in FIG. 9, in cases where an affirmative determination is made in step S103, the routine goes to step S401. In step S401, the penetration force of fuel at the time of the post injection is set according to the engine rotation speed. That is, the pressure of fuel at the time of the post injection is set according to the engine rotation speed. The relation between the engine rotation speed and the pressure of fuel at the time of the post injection has been obtained by experiments, simulations, or the like in advance, so that the suppression of smoke and the improvement in fuel economy can be achieved. In step S401, the ratio of the pressure of fuel at the time of the post injection with respect to the pressure of fuel at the time of the main injection is set to become higher in accordance with the increasing engine rotation speed. When the processing of step S401 ends, this routine is ended. Thus, the penetration force of fuel can be adjusted by adjusting the pressure of the fuel at the time of the post injection in a stepless manner, too.

Fifth Embodiment

In the above-mentioned embodiments, the amount of post injection is equally divided into two, for example. On the other hand, in this fifth embodiment, in cases where the post injection is carried out by being divided into a first post sub-injection and a second post sub-injection, the penetration force of first post sub-injection fuel and the penetration force of second post sub-injection fuel are decided based on the engine rotation speed. Specifically, the higher the engine rotation speed, the lower the proportion of the amount of post injection with a small penetration force is made low, and the proportion of the amount of post injection with a large penetration force is made high. Here, note that any one of the post injection with a large penetration force and the post injection with a small penetration force may be carried out earlier than the other. The devices, parts and so on other than this are the same as those in the above-mentioned embodiments, so the explanation thereof is omitted.

FIG. 10 is a view showing the relation among an engine rotation speed, the amount of post injection with a small penetration force, and the amount of post injection with a large penetration force. A required amount of post injection is an amount of fuel injection in the entire post injection, which is decided based on the operating state of the internal combustion engine 1. The required amount of post injection has been obtained by experiments, simulations, or the like in advance, so that the generation of smoke can be suppressed and fuel economy can be improved.

In cases where the engine rotation speed is equal to or more than NE1 and at the same time is less than NE2, a post sub-injection with a small penetration force is carried out only once. In addition, in cases where the engine rotation speed is equal to or more than NE3 and at the same time is equal to or less than NE4, a post sub-injection with a large penetration force is carried out only once. In cases where the engine rotation speed is equal to or more than NE2 and at the same time is less than NE3, a post sub-injection with a small penetration force (e.g., a first post sub-injection) and a post sub-injection with a large penetration force (e.g., a second post sub-injection) are carried out a total of two times. Here, note that the sum total of the amount of first post sub-injection and the amount of second post sub-injection becomes the required amount of post injection. That is, the sum total of the amount of post sub-injection with a small penetration force and the amount of post sub-injection with a large penetration force becomes the required amount of post injection. Then, the ratio between the amount of post injection with a small penetration force and the amount of post injection with a large penetration force (i.e., the ratio between the amount of the first post sub-injection and the amount of the second post sub-injection) is changed in such a manner that the higher the engine rotation speed, the higher becomes the ratio of the amount of post injection with a large penetration force with respect to the required amount of post injection. The relation shown in FIG. 10 has been obtained by experiments, simulations, or the like in advance, so that the suppression of smoke and the improvement of fuel economy can be achieved.

Here, in the second region R2, the effect of carrying out the post sub-injection with a large penetration force, and the effect of carrying out the post sub-injection with a small penetration force can be obtained. However, in the second region R2, too, the higher the rotation speed of the internal combustion engine, the shorter becomes the period of time of the re-oxidation of soot, so that the effect obtained in the case of carrying out the post sub-injection with a large penetration force becomes large, and the effect obtained in the case of carrying out the post sub-injection with a small penetration force becomes small. Accordingly, by making the proportion of the amount of post sub-injection with a large penetration force higher in accordance with the increasing engine rotation speed, the agitation of the combustion gas can be promoted, so that the combustion speed or rate can be enhanced in accordance with the decreasing period of time in which the re-oxidation of soot is carried out.

FIGS. 11A and 11B are time charts showing changes over time of the injection rate of fuel in the second region R2. FIG. 11A shows the case where the engine rotation speed is low, and FIG. 11B shows the case where the engine rotation speed is high. In FIGS. 11A and 11B, a pilot injection is carried out before the main injection, and the post injection is carried out after the main injection.

As shown in FIG. 11A, in the post injection in the second region R2 in the case where the engine rotation speed is low, the amount of first post sub-injection with a small penetration force is larger than the amount of second post sub-injection with a large penetration force. For this reason, the effect of making use of the oxygen at the cylinder center side becomes larger than the effect due to the agitation of the combustion gas.

On the other hand, as shown in FIG. 11B, in the post injection in the second region R2 in the case where the engine rotation speed is high, the amount of second post sub-injection with a large penetration force is larger than the amount of first post sub-injection with a small penetration force. For this reason, the effect due to the agitation of the combustion gas becomes larger than the effect due to the use of the oxygen at the cylinder center side.

As shown in FIGS. 11A and 11B, in the second region R2, in the case where the engine rotation speed is relatively low, the amount of post sub-injection with a small penetration force is large, and the amount of post sub-injection with a large penetration force is small. On the other hand, in the second region R2, in the case where the engine rotation speed is relatively high, the amount of post sub-injection with a small penetration force is small, and the amount of post sub-injection with a large penetration force is large. In the post sub-injection with a small penetration force, the fuel injection rate goes up gradually, but in the post sub-injection with a large penetration force, the fuel injection rate goes up rapidly. For this reason, in cases where the amount of post injection with a small penetration force has been increased because the engine rotation speed is low, the amount of fuel to be injected in a state where the fuel injection rate is low becomes large. As a result of this, the amount of the fuel combusting at the cylinder center side becomes larger, so it is possible to promote the use of the oxygen existing at the cylinder center side. On the other hand, in cases where the amount of post injection with a large penetration force has been increased because the engine rotation speed is high, the amount of fuel to be injected in a state where the fuel injection rate is high becomes large. As a result of this, the fuel combusting at the cylinder wall surface side can be perturbed or agitated, thus making it possible to promote the combustion of the fuel.

FIG. 12 is a flow chart showing a flow or routine for determining the amount of post injection according to this fifth embodiment of the present invention. The routine in this flow chart is carried out by means of the ECU 10 at each combustion cycle. For those steps in which the same processings as in the aforementioned flow charts are carried out, the same symbols are attached and the explanation thereof is omitted. Here, note that in this fifth embodiment, the ECU 10, which carries out the flow or routine of the flow chart shown in FIG. 12, corresponds to the controller in the present invention.

In the flow chart shown in FIG. 12, in cases where an affirmative determination is made in step S103, the routine goes to step S501. In step S501, it is determined whether the engine rotation speed is within the range of the second region R2. That is, it is determined whether the engine rotation speed is equal to or more than NE2 and is less than NE3. In this step, it is determined whether the post injection is carried out by being divided into two.

In cases where an affirmative determination is made in step S501, the routine goes to step S502. In step S502, the amount of the first post sub-injection and the amount of the second post sub-injection are calculated, respectively. Here, note that in this flow chart, an explanation will be made on the assumption that the first post sub-injection is the post injection with a small penetration force, and the second post sub-injection is the post injection with a large penetration force. The required amount of post injection, which is an amount of fuel injection which is the sum of the amount of first post sub-injection and the amount of second post sub-injection, is decided based on the operating state of the internal combustion engine 1. Further, the ratio between the amount of first post sub-injection and the amount of second post sub-injection is obtained by the relation shown in FIG. 10. The relation shown in FIG. 10 has been obtained in advance beforehand through experiments, etc., and has been stored in the ECU 10. The amount of first post sub-injection and the amount of second post sub-injection are respectively calculated by dividing the required post injection by the ratio shown in FIG. 10. When the processing of step S502 is completed, the routine goes to step S503.

In step S503, the penetration force of the first post sub-injection fuel is decided. The penetration force can be changed by the valve opening speed of the needle 42 or the pressure of fuel, as explained in the above-mentioned embodiment. In this flow chart, the first post sub-injection is a fuel injection with a small penetration force, according to which the valve opening speed of the needle 42 at the time of the first post sub-injection or the pressure of fuel at the time of the first post sub-injection is decided. The penetration force at this time may be a fixed value, or may be made to change according to the operating state of the internal combustion engine 1. When the processing of step S503 is completed, the routine goes to step S504.

In step S504, the penetration force of the second post sub-injection fuel is decided. In this flow chart, the second post sub-injection is a fuel injection with a large penetration force, according to which the valve opening speed of the needle 42 at the time of the first post sub-injection or the pressure of fuel at the time of the first post sub-injection is decided. The penetration force at this time may be a fixed value, or may be made to change according to the operating state of the internal combustion engine 1. When the processing of step S504 ends, this routine is ended.

On the other hand, in cases where a negative determination is made in step S501, the routine goes to step S505, where the amount of post injection fuel is decided. The amount of post injection decided in step S505 is the amount of post injection in the first region R1 or the third region R3, and is equal to the above-mentioned required amount of post injection. When the processing of step S505 is completed, the routine goes to step S506.

In step S506, the penetration force of post injection fuel is decided. The penetration force in this case is the penetration force of the first region R1 or the second region R2, and is decided similarly, as in the above-mentioned embodiments. When the processing of step S506 ends, this routine is ended.

As described above, according to this fifth embodiment, the higher the engine rotation speed, the higher the proportion of the amount of fuel injection with a large penetration force in the post injection is made, and the lower the proportion of the amount of fuel injection with a small penetration force is made. As a result, in the case where the engine rotation speed is relatively low, the use of the oxygen at the cylinder center side can be promoted. On the other hand, in the case where the engine rotation speed is relatively high, the agitation of the combustion gas can be promoted. In either case, the combustion of fuel can be promoted, so that the generation of smoke can be suppressed, and fuel economy can be improved.

Here, note that in this fifth embodiment, the amount of first post sub-injection and the amount of second post sub-injection are changed according to the number of engine revolutions per unit time, but in addition, the amount of first post sub-injection and the amount of second post sub-injection may be changed in consideration of the amount of fuel injection. Similarly, in consideration of the amount of fuel injection, whether the post injection is to be divided may be decided, or the frequency in which the post injection is divided may be decided. The relation of the engine rotation speed and the amount of fuel injection with the penetration force of the post injection fuel, the frequency of division, and the amount of each post sub-injection fuel may have been obtained in advance through experiments, simulations or the like, and made into a map.

In addition, in this fifth embodiment, the post injection is carried out by being divided into two sub-injections only in the second region R2, but instead of this, in the other operating region(s), too, the post injection may also be carried out by being divided into two sub-injections. In this case, in the other operating region(s), the higher the engine rotation speed, the higher the proportion of the amount of fuel injection with a large penetration force in the post injection may also be made. Moreover, an operating region in which the post injection is carried out may not be divided into the first region R1, the second region R2 and the third region R3, but instead, simply, in the operating region in which the post injection is carried out, the proportion of the amount of fuel injection with a large penetration force in the post injection may also be made higher in accordance with the increasing engine rotation speed.

REFERENCE SIGNS LIST 1 internal combustion engine
2 cylinder
3 piston
4 fuel injection valve
5 common rail
6 fuel supply pipe 7 fuel pump
8 pressure adjusting mechanism
10 ECU
16 accelerator pedal
17 accelerator opening sensor
18 crank position sensor
31 cavity
41 holes
42 needle
43 value operating mechanism

The invention claimed is:

1. An internal combustion engine which is provided with a fuel injection valve for injecting fuel into a cylinder of the internal combustion engine, said internal combustion engine including an electronic control unit configured to control the fuel to be injected from said fuel injection valve when a post injection is carried out after a main injection, the electronic control unit being configured to control said fuel injection valve to make a penetration force of fuel in the post injection larger than a penetration force of fuel in the main injection by accordingly changing a valve opening speed of a needle in said fuel injection valve when a rotation speed of said internal combustion engine is equal to or more than a first predetermined speed, whereas when the rotation speed of said internal combustion engine is less than a second predetermined speed which is less than said first predetermined speed, the electronic control unit is configured to control said fuel injection valve to make the penetration force of fuel in the post injection smaller than the penetration force of fuel in the main injection by accordingly changing the valve opening speed of the needle in said fuel injection valve, wherein when the rotation speed of said internal combustion engine is equal to or more than said second predetermined speed, and at the same time is less than said first predetermined speed, said electronic control unit carries out the post injection a plurality of times after the main injection, and when the post injection is carried out the plurality of times after the main injection, the post injection is divided into a plurality of sub-injections, such that each sub-injection of the plurality of sub-injections has a respective penetration force of fuel, and wherein when said post injection is carried out by being divided into the plurality of sub-injections, said electronic control unit carries out the post injection such that the plurality of sub-injections includes a first sub-injection in which the penetration force of fuel is larger than that in the main injection, and a second sub-injection in which the penetration force of fuel is smaller than that in the main injection, and makes a ratio of an amount of fuel injection in said first sub-injection with respect to a total amount of fuel injection in the post injection higher in accordance with an increasing rotation speed of said internal combustion engine.

2. The internal combustion engine as set forth in claim 1, wherein by accordingly changing the valve opening speed of the needle in said fuel injection valve when the post injection is carried out, said electronic control unit makes the penetration force of fuel in the post injection larger in accordance with the increasing rotation speed of said internal combustion engine.

3. An internal combustion engine which is provided with a fuel injection valve for injecting fuel into a cylinder of the internal combustion engine, said internal combustion engine including an electronic control unit configured to control the fuel to be injected from said fuel injection valve when a post injection is carried out after a main injection, the electronic control unit being configured to control said fuel injection valve to make a penetration force of fuel in the post injection larger than a penetration force of fuel in the main injection by accordingly changing a valve opening speed of a needle in said fuel injection valve when a rotation speed of said internal combustion engine is equal to or more than a first predetermined speed, whereas when the rotation speed of said internal combustion engine is less than a second predetermined speed which is less than said first predetermined speed, the electronic control unit is configured to control said fuel injection valve to make the penetration force of fuel in the post injection smaller than the penetration force of fuel in the main injection by accordingly changing the valve opening speed of the needle in said fuel injection valve, and wherein the electronic control unit is configured to further control said fuel injection valve to increase the penetration force of fuel in the post injection by increasing the valve opening speed of the needle in said fuel injection valve when the post injection is carried out.

4. An internal combustion engine which is provided with a fuel injection valve for injecting fuel into a cylinder of the internal combustion engine, said internal combustion engine including an electronic control unit configured to control the fuel to be injected from said fuel injection valve when a post injection is carried out after a main injection, the electronic control unit being configured to control said fuel injection valve to make a penetration force of fuel in the post injection larger than a penetration force of fuel in the main injection by accordingly changing a valve opening speed of a needle in said fuel injection valve when a rotation speed of said internal combustion engine is equal to or more than a first predetermined speed, whereas when the rotation speed of said internal combustion engine is less than a second predetermined speed which is less than said first predetermined speed, the electronic control unit is configured to control said fuel injection valve to make the penetration force of fuel in the post injection smaller than the penetration force of fuel in the main injection by accordingly changing the valve opening speed of the needle in said fuel injection valve, and wherein the electronic control unit is configured to further control said fuel injection valve to decrease the penetration force of fuel in the post injection by decreasing the valve opening speed of the needle in said fuel injection valve when the post injection is carried out.

* * * * *